Jan. 9, 1934.  G. H. WHEATLEY  1,943,101
VULCANIZING MACHINE
Filed Oct. 22, 1930  2 Sheets-Sheet 1
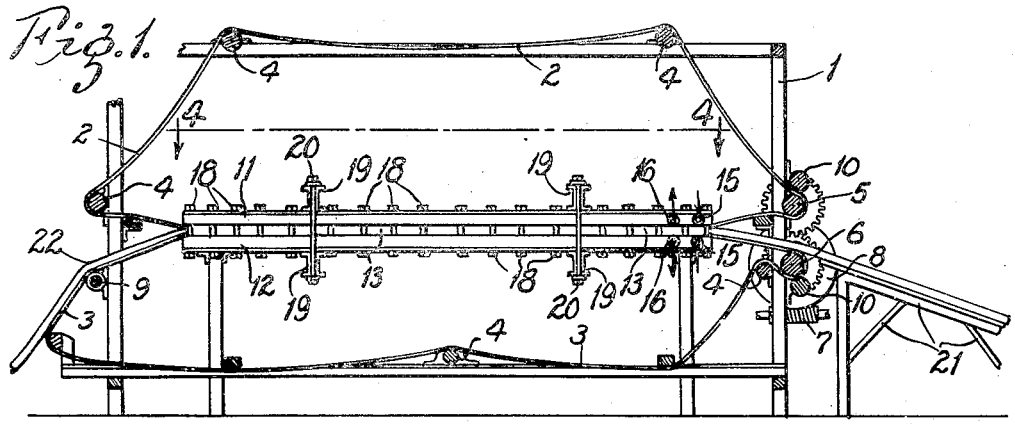
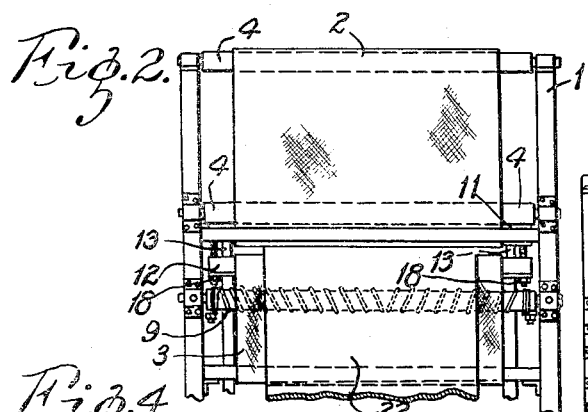
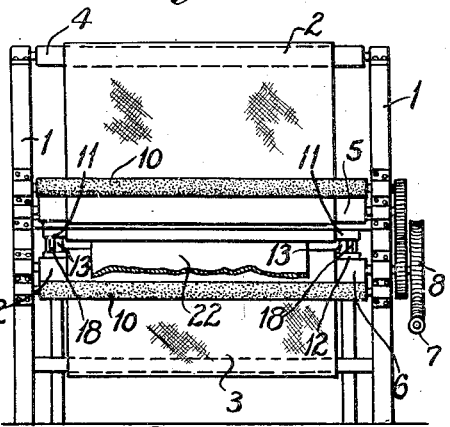
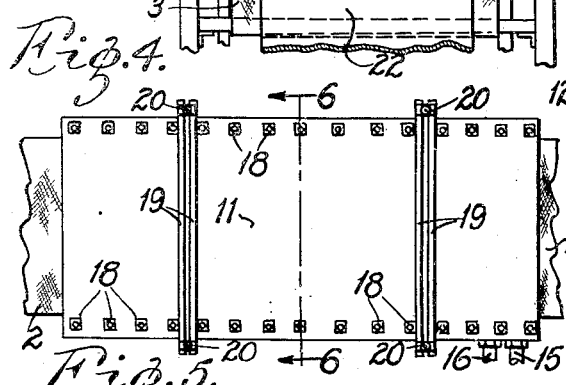
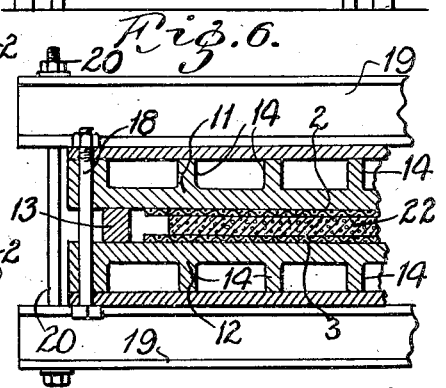
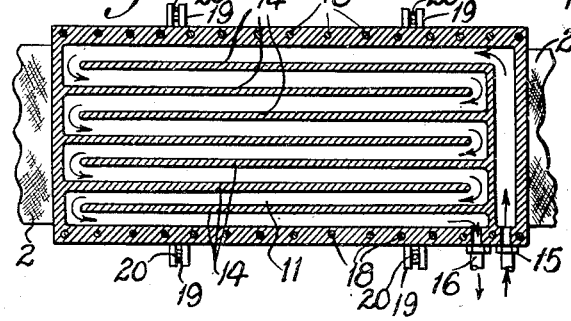

Jan. 9, 1934.   G. H. WHEATLEY   1,943,101
VULCANIZING MACHINE
Filed Oct. 22, 1930   2 Sheets-Sheet 2
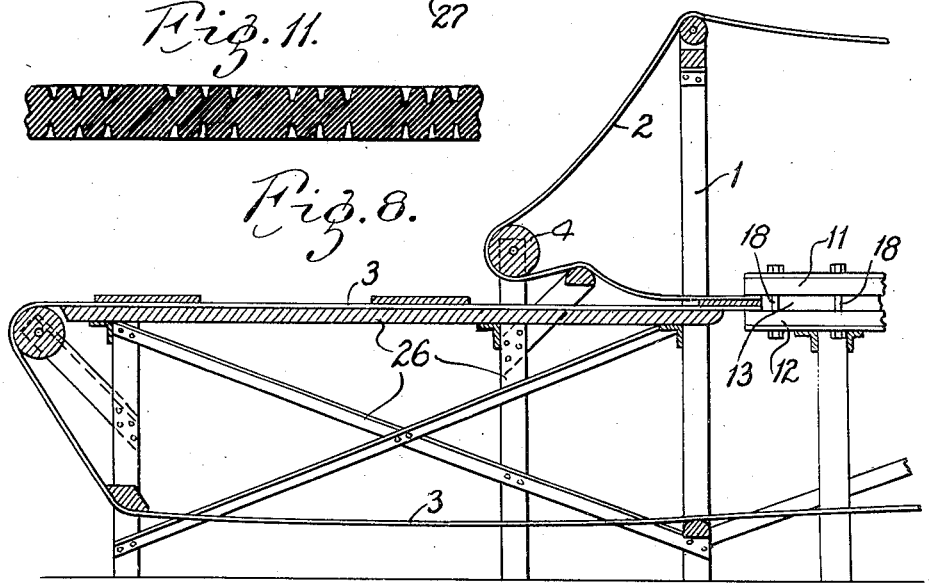

Patented Jan. 9, 1934

1,943,101

UNITED STATES PATENT OFFICE 1,943,101

VULCANIZING MACHINE

George H. Wheatley, Fond du Lac, Wis.

Application October 22, 1930. Serial No. 490,366

2 Claims. (Cl. 18—17)

This invention relates to vulcanizing machines, and, with regards to certain more specific features, to machines for vulcanizing sponge rubber and the like in continuous strips of any desired lengths.

Among the several objects of the invention may be noted the provision of a process and means for vulcanizing sponge rubber in continuous strips, without necessitating intermittent operation of the vulcanizing machine; the provision of means of the class described whereby an accurate and careful control of the temperature of vulcanizing and of the surface of the vulcanized article may be achieved; the provision of a vulcanizing machine of the class described whereby the rate of vulcanization, as well as the temperature and other factors thereof may be readily controlled; the provision of means whereby the rubber in the course of vulcanization may be imprinted with a design or the like, means whereby rubber may be vulcanized in shapes other than regular flat strips, the provision of a vulcanizing machine of the class described whereby small, piece goods may be as readily vulcanized as continuous strips; and the provision of a machine of the class described which is simple in construction and operation, and which requires a minimum of attention on the part of the operator. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a side elevation of one embodiment of my invention, certain portions being broken away;

Fig. 2 is an end elevation of the left or feed end of the machine shown in Fig. 1;

Fig. 3 is an end elevation of the right or delivery end of the machine shown in Fig. 1;

Fig. 4 is a top plan view of a heating plate portion of the Fig. 1 embodiment;

Fig. 5 is a horizontal cross section of the heating plate shown in Fig. 4;

Fig. 6 is a vertical cross section of the heating plate shown in Fig. 4 being taken on line 6—6 of Fig. 4;

Fig. 7 is a view similar to Fig. 5, showing a modified form of the heating plate;

Fig. 8 is a vertical section similar to the feed end of Fig. 1 showing an alternative embodiment of the invention;

Fig. 9 is a cross-section of a material prior to vulcanization, illustrating the manner in which a continuous strip is formed from shorter pieces;

Fig. 10 is a cross section of a modified form of a belt shown in Figs. 1, 2 and 3; and, Fig. 11 is a cross section of an imprinted product produced with the modified belt shown in Fig. 10.

Similar reference characters indicate corresponding parts throughout the several views of the drawings.

Vulcanization of rubber has hitherto been achieved only in sheets of pieces of sizes which can be manually handled. The present invention provides a means for vulcanizing strips of unlimited lengths.

Referring now more particularly to Fig. 1, there is illustrated at numeral 1 a suitable framework for supporting certain heating plates and belts to be described hereinafter. Numerals 2 and 3 indicate upper and lower endless fabric carrying belts, respectively. The belts 2 and 3 are supported on suitable idler cylinders 4, and are driven, in the present embodiment, by a pair of drums 5 and 6 respectively. The drive drums or rollers 5 and 6, as illustrated in Figs. 1, 2 and 3, are preferably geared together with gears of equal size so that the rate of travel of the belts 2 and 3 is equal. The driving rollers 5 and 6 are motivated by any suitable means, such as the worm gear 7 and worm wheel 8 shown in Figs. 2 and 3. It is to be understood that any other suitable driving means may be employed.

A spacer roller 9 is preferably placed at the feed end of belt 3 in order to keep said belt 3 laterally stretched. A suitable spacer roller may also be used for the upper belt 2.

Idler rollers 10 are provided to hold said belts 2 and 3 tightly against said driving rollers 5 and 6, respectively, in order that said rollers 5 and 6 may suitably engage said belts 2 and 3 for driving.

The framework 1 also supports, in the interior thereof, a pair of heating plates 11 and 12. The heating plates 11 and 12 are illustrated more in detail in Figs. 4 to 7. The heating plates 11 and 12 are suitably spaced by means of steel bars or the like 13, indicated in Fig. 6.

The heating plates 11 and 12 per se comprise hollow plates having therein a chamber or the like for conducting a heating medium such as live steam. In Fig. 5 is illustrated a system of baffle plates 14, which direct the live steam entering at 15 so that it heats the entire surface of the plate uniformly and issues therefrom at 16 as spent steam.

As illustrated in Fig. 7, a suitable coil 17 may replace the baffle 14 for conducting the heating fluid uniformly through the heating plates 11 and 12. Other heating means such as, for example, electrical resistance, can also be used to effect the heating of the plates 11 and 12. It is desirable that the lower surface of plate 11 and the upper surface of plate 12, be kept uniformly at the same temperature over their entire area in order that a homogeneous vulcanizing may be accomplished.

The heating plates 11 and 12 are held together in spaced relationship by the bar 13, bolts 18 and by means of I-beams 19 and bolts 20. For the purposes of the present embodiment it is desirable that the plates 11 and 12 be spaced at a uniform distance throughout their area. However, in certain modifications pointed out hereinafter, varied spacing of the plates 11 and 12 may be desirable.

While a single pair of plates 11 and 12 is illustrated in Fig. 1, it is to be understood that any suitable number of similar plates may be arranged in longitudinal series relative to the travel of belts 2 and 3. This may be desirable in cases where a changing temperature of vulcanizing is desired, because, with a multiple number of heating plates 11 and 12 in series, each pair of plates can be individually regulated to the desired temperature.

The carrying belts 2 and 3 travel longitudinally preferably in a uniform direction and at a uniform speed between the heating plates 11 and 12 in the spacing provided by the spacer bar 13.

A strip of unvulcanized sponge rubber 22 which is to be vulcanized is fed between the belts 2 and 3 at the feed or left hand end of the machine illustrated in Fig. 1. The belts 2 and 3, moving at a uniform speed, carry said strip between the heating plates 11 and 12 at a rate predetermined by the rate of driving of the cylinders 5 and 6. The vulcanized strip issues at the right hand end of the vulcanizing apparatus shown in Fig. 1 and is conducted away on a delivery table 21.

Regulation of the vulcanizing process is accomplished in the following manner:

First, the degree of heat can be varied by means of varying the pressure of the steam in the heating plates 11 and 12 or varying the current in case electrical heating plates are used.

Second, the pressure exerted upon the rubber in the vulcanizing process can be regulated by means of the distance between the plates 11 and 12, as controlled by the spacing bar 13.

Third, the dwell of the rubber in the heated region, as determined by the speed of the belts 2 and 3, can be controlled by controlling the speed of the driving wheel 8.

A typical unvulcanized material is illustrated in Fig. 9. It will be seen that this raw, unvulcanized material, for example, comprises a layer of sponge rubber composition 23, backed on either side by a rubberized fabric layer 24. The unvulcanized sponge rubber is preferably spliced together before or as it passes into the vulcanizing machine as illustrated in Fig. 9. This splicing is accomplished by means of cutting the rubber composition at an angle and allowing for an overlap of the fabric backing as illustrated generally at numeral 25.

As the unvulcanized strip 22 is fed between the heating plates 11 and 12, carried between the belts 2 and 3, it is gradually heated. At first, the rubber composition melts, and at the same time exhibits a swelling tendency. At this point the rubber is not sufficiently strong to support its own weight, so that were it not for the belts 2 and 3 the strip 22 the rubber would pull apart. The swelling tendency of the strip is limited by the fixed spacing between the stationary plates 11 and 12, so that, as the vulcanization proceeds and the sponge rubber compound commences to harden, it is restricted in thickness to the distance between the plates 11 and 12, according to the thickness of the spacer rod 13.

The strip 22, now in a permanently vulcanized condition, issues from the vulcanizing machine at the right hand end thereof and is carried away under its own weight on the delivery table 21. The vulcanization process has secured the adjacent pieces of rubber so securely that the joint 25 (see Fig. 9) is no longer apparent. The vulcanized strip is accordingly unlimited in length, independently of the machine.

Fig. 8 illustrates a modification of the feed or left hand end of Fig. 1. In this Fig. 8 modification a feeding table 26, over which the lower carrying belt 3 passes, is provided. The Fig. 8 modification is expressly adapted for use when it is desired to vulcanize small pieces, instead of strips. The feed table 26 facilitates the placing of the pieces to be vulcanized upon the carrying belt 3, for subsequent passage between the heating plates 11 and 12. In other respects, the operation of the Fig. 8 modification is similar to the operation of the Fig. 1 embodiment.

If it is desired to imprint or mold the rubber in the course of vulcanization, either one or both of the belts 2 and 3 may be provided with suitable raised portions thereon for securing the desired design. For example, if the belts 2 and 3 are made of canvas, they may be filleted by suitable stitching, as illustrated at numeral 27 in Fig. 10. The belts 2 and 3, or either of them, carrying the mold or negative imprint of the design which it is desired to place on the rubber, function as molds between the plates 11 and 12 during the softening and expanding stage of the vulcanization, and the product issues from the delivery end, accordingly, with the imprint thereon. Such an imprinted product is shown in Fig. 11.

If imprinting is to be accomplished, or under other conditions, it may be desirable that the spacing between the plates 11 and 12 decrease towards the delivery end. This may be accomplished by tapering the spacing bars 13.

This machine is equally well adapted for the vulcanizing of both sponge and other types of rubber. The type of the finished product, depends, of course, on the composition of the unvulcanized rubber, as indicated at numeral 23 in Fig. 9. Fabric backings such as 24 in Fig. 9 may or may not be utilized as occasion demands.

By reason of the process and apparatus herein described, it is possible to prepare sheet solid rubber or sponge rubber in substantially any desired size. This availability of rubber in larger size pieces than heretofore leads to many new uses for this rubber. For example, these larger size sponge or solid rubber pieces may be used for floor coverings without undesirable splicing, shock-absorbing pads to be used under carpets and the like, sound insulation for walls, miniature golf course coverings, as well as for many other purposes.

With suitable molding belts as shown in Fig. 10, rubber cords, rubber moldings, rubber edgings, rubber upholstery fittings and the like may be made in unlimited continuous lengths.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A vulcanizing machine for sponge rubber comprising at least one pair of plates, means for holding said plates apart in spaced relationship, means for maintaining said plates at substantially uniform temperature throughout their opposing surfaces, an upper and a lower endless fabric carrying belt, said belts passing between said heating plates, means for moving said carrying belts between said heating plates at a substantially uniform speed and in the same direction, and at least one of said carrying belts having thereon a mold adapted to produce an imprint upon the material to be vulcanized.

2. A vulcanizing machine for sponge rubber comprising at least one upper and at least one lower heating plate, means for maintaining the lower surface of said upper heating plate, and the upper surface of said lower heating plate at substantially uniform temperatures throughout the adjacent areas thereof, an upper endless fabric belt and a lower endless fabric belt passing between said heating plates, means for moving said carrying belt between the heating plates in a uniform direction and at a substantially uniform speed, and means for supporting the portions of said endless belts not between said heating plates, at least one of said fabric belts carrying thereon a mold adapted to produce an imprint upon a material in the process of being vulcanized.

GEORGE H. WHEATLEY.